(12) United States Patent
Luo

(10) Patent No.: US 10,048,799 B2
(45) Date of Patent: Aug. 14, 2018

(54) DISPLAY PANEL, DRIVING METHOD, AND DISPLAY DEVICE

(71) Applicants: Xiamen Tianma Micro-Electronics Co., Ltd., Xiamen (CN); Tianma Micro-Electronics Co., Ltd., Shenzhen (CN)

(72) Inventor: Sijian Luo, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 15/434,175

(22) Filed: Feb. 16, 2017

(65) Prior Publication Data

US 2017/0160843 A1 Jun. 8, 2017

(30) Foreign Application Priority Data

Oct. 31, 2016 (CN) .......................... 2016 1 0928816

(51) Int. Cl.
G06F 3/042 (2006.01)
G06F 3/041 (2006.01)
G06F 3/044 (2006.01)
G09G 3/20 (2006.01)

(52) U.S. Cl.
CPC ............ *G06F 3/0416* (2013.01); *G06F 3/044* (2013.01); *G06F 3/0412* (2013.01); *G09G 3/20* (2013.01)

(58) Field of Classification Search
CPC ...... G06F 3/0416; G06F 3/044; G06F 3/0412; G09G 3/20
See application file for complete search history.

(56) References Cited

U.S. PATENT DOCUMENTS

| 2014/0043288 A1* | 2/2014 | Kurasawa | G06F 3/0412 345/174 |
| 2016/0216816 A1* | 7/2016 | Yang | G02F 1/13338 |
| 2017/0308237 A1* | 10/2017 | Sun | G06F 3/0412 |

FOREIGN PATENT DOCUMENTS

| CN | 104020881 A | 9/2014 |
| CN | 205334415 U | 6/2016 |

* cited by examiner

*Primary Examiner* — Adam R Giesy
(74) *Attorney, Agent, or Firm* — Anova Law Group, PLLC

(57) ABSTRACT

A display panel, a driving method, and a display panel are provided. The display panel comprises a plurality of touch driving electrodes, and at least one touch driving circuit electrically connected to the plurality of touch driving electrodes. The at least one touch driving circuit drives the display panel to enter a plurality of touch stages in one frame period, in which the one frame period includes a plurality of touch stages and a plurality of display stages. In a touch stage, the at least one touch driving circuit provides a touch scanning signal to one of the plurality of touch driving electrodes and, meanwhile provides a common voltage signal to the other touch driving electrodes.

17 Claims, 9 Drawing Sheets

DISPLAY PANEL, DRIVING METHOD, AND DISPLAY DEVICE

CROSS-REFERENCES TO RELATED APPLICATIONS

This application claims priority of Chinese Patent Application No. 201610928816.X, filed on Oct. 31, 2016, the entire contents of which are hereby incorporated by reference.

FIELD OF THE INVENTION

The present disclosure generally relates to the field of display technology and, more particularly, relates to a display panel, a driving method, and a display device thereof.

BACKGROUND

As the applications and demands of touch screen display technologies keep developing, thinner and lighter touch screen displays have become a trend. Currently, to reduce the thickness of the touch screen, a common electrode in a display screen is often multiplexed as a touch electrode. In a display stage, the common electrode provides a reference voltage required to rotate the liquid crystal molecules in pixels of the display screen. In a touch stage, the common electrode receives a touch detection signal, and a touching position is determined by the received touch detection signal, accordingly.

In an existing touch screen display, the common electrode is often divided into a plurality of touch electrodes, and a touch detection signal is sequentially provided to each of the plurality of touch electrodes in the touch stage. When the touch detection signal is applied to one of the plurality of touch electrodes, the other touch electrodes are independent from each other, however, these touch electrodes without being applied with the touch detection signal may have different potentials. Thus, when being switched to the display stage, these touch electrodes may also have different potentials. Vertical stripes may appear on the display screen, and the display performance may be degraded accordingly.

The disclosed display panel, driving method, and display device thereof are directed to solve one or more problems set forth above and other problems.

BRIEF SUMMARY OF THE DISCLOSURE

One aspect of the present disclosure provides a display panel. The display panel comprises a plurality of touch driving electrodes, and at least one touch driving circuit electrically connected to the plurality of touch driving electrodes. The at least one touch driving circuit drives the display panel to enter a plurality of touch stages in one frame period, in which the one frame period includes a plurality of touch stages and a plurality of display stages. In a touch stage, the at least one touch driving circuit provides a touch scanning signal to one of the plurality of touch driving electrodes and, meanwhile provides a common voltage signal to the other touch driving electrodes.

Another aspect of the present disclosure provides a driving method for the display panel comprising a plurality of touch driving electrodes, and at least one touch driving circuit electrically connected to the plurality of touch driving electrodes, wherein the at least one touch driving circuit drives the display panel to enter a plurality of touch stages in one frame period, the one frame period includes a plurality of touch stages and a plurality of display stages, and in a touch stage, the at least one touch driving circuit provides a touch scanning signal to one of the plurality of touch driving electrodes and, meanwhile provides a common voltage signal to the other touch driving electrodes. The driving method comprises: in a display stage, providing, by the at least one touch driving circuit, the common voltage signal to the touch driving electrodes; and in the touch stage, providing, by the at least one touch driving circuit, the touch scanning signal to one of the plurality of touch driving electrodes and, meanwhile providing the common voltage signal to the other touch driving electrodes.

Another aspect of the present disclosure provides a display device including a display panel, wherein the display panel comprises a plurality of touch driving electrodes, and at least one touch driving circuit electrically connected to the plurality of touch driving electrodes. The at least one touch driving circuit drives the display panel to enter a plurality of touch stages in one frame period, in which the one frame period includes a plurality of touch stages and a plurality of display stages. In a touch stage, the at least one touch driving circuit provides a touch scanning signal to one of the plurality of touch driving electrodes and, meanwhile provides a common voltage signal to the other touch driving electrodes.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention. Further, in the present disclosure, the disclosed embodiments and the features of the disclosed embodiments may be combined under conditions without conflicts.

The present disclosure provides an improved display panel capable of minimizing the nonuniform brightness caused by different potentials at different touch driving electrodes, thereby enhancing the display performance.

Figure 1:
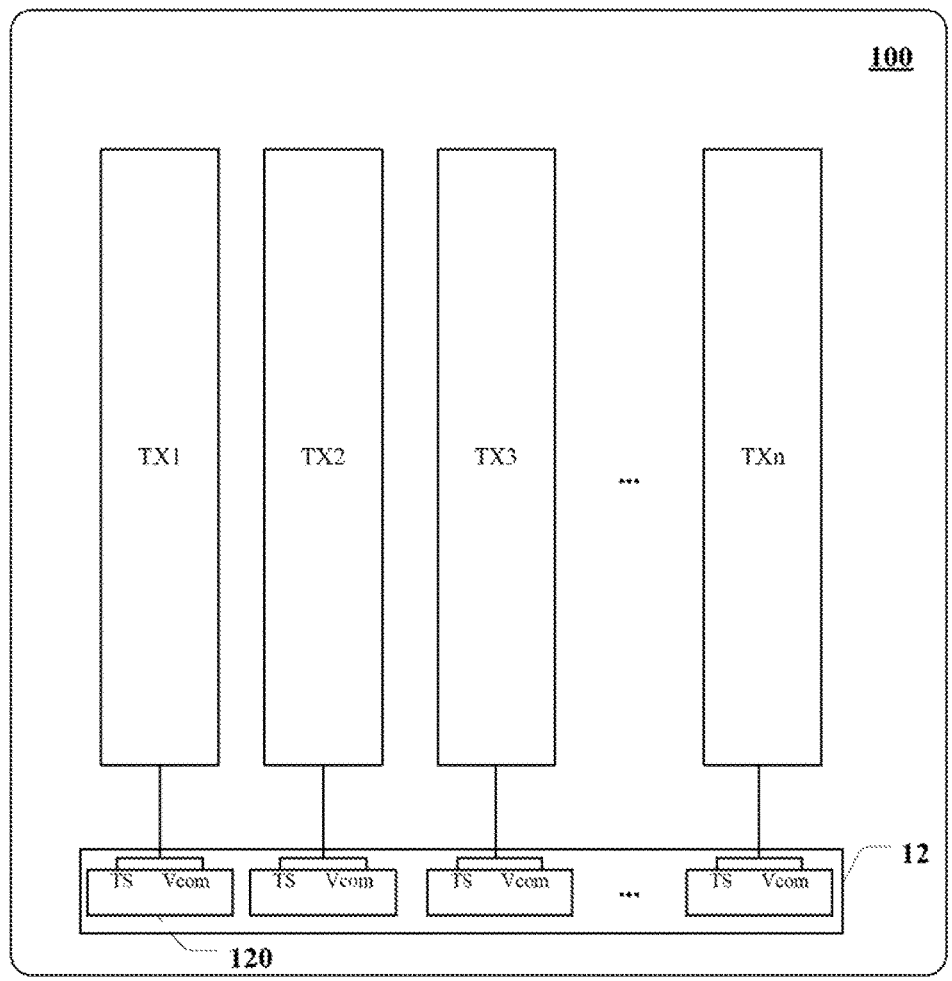
FIG. 1 illustrates a top view of an exemplary display panel consistent with disclosed embodiments.

FIG. 1 illustrates a top view of an exemplary display panel 100 consistent with disclosed embodiments. As shown in FIG. 1, the display panel 100 may include a plurality of touch driving electrodes TX1, TX2, TX3, . . . , TXn and at least one touch driving circuit 12, where n is a positive integer and denotes the number of touch driving electrodes. The plurality of touch driving electrodes TX1, TX2, TX3, . . . , TXn may be electrically connected to the touch driving circuit 12.

The touch driving circuit 12 may be configured to, during one frame period, drive the display panel 100 to enter a plurality of touch stages. A frame period may refer to a period for displaying one image frame. The touch driving circuit 12 may be configured to, in each touch stage, provide a touch scanning signal to one touch driving electrode TXi and, meanwhile, provide a common voltage signal to the other touch driving electrodes (i.e., the touch driving electrode other than TXi), where i is a positive integer, and i≤n.

In the disclosed embodiments, each of the touch driving electrodes TX1, TX2, TX3, . . . , TXn may be multiplexed as a common electrode. That is, during the touch stages, the touch driving electrode may receive the touch scanning signal, while during the display stage, the touch driving electrode may be used as the common electrode, which receives the common voltage signal and provides the pixels on the display panel with the common voltage required for displaying.

During each touch stage, the touch driving circuit 12 may drive one of the touch driving electrodes to perform a touch scanning (i.e., working with touch sensing electrodes to detect a touch in a corresponding area on the touch screen) and, meanwhile, provide the common voltage signal to the other touch driving electrodes. Thus, the other touch driving electrodes may have the same potential (i.e., common voltage), which is different from the touch driving electrode performing the touch scanning.

Further, in the disclosed embodiments, the touch driving circuit 12 may drive the display panel 100 to enter a plurality of display stages during one frame period, which includes at least n numbers of touch stages. The display panel 100 may alternately enter the display stage and the touch stage. The touch driving circuit 12 may drive one touch driving electrode to perform the touch scanning in each touch stage and, thus, the touch driving circuit 12 may finish one touch detection of n number of touch driving electrodes TX1, TX2, TX3, . . . , TXn in the n number of touch stages. That is, the touch driving circuit 12 may finish the touch detection of n number of touch driving electrodes TX1, TX2, TX3, . . . , TXn once after the n number of touch stages.

The disclosed display panel may be a liquid crystal display (LCD) panel, an organic light-emitting diode (OLED) display panel, a plasma display panel (PDP), a field emission display (FED) panel, a light-emitting diode (LED) display panel, a quantum dots (QDs) display panel, an electrophoretic display panel or other appropriate display panel capable of displaying videos and/or images.

Figure 2:
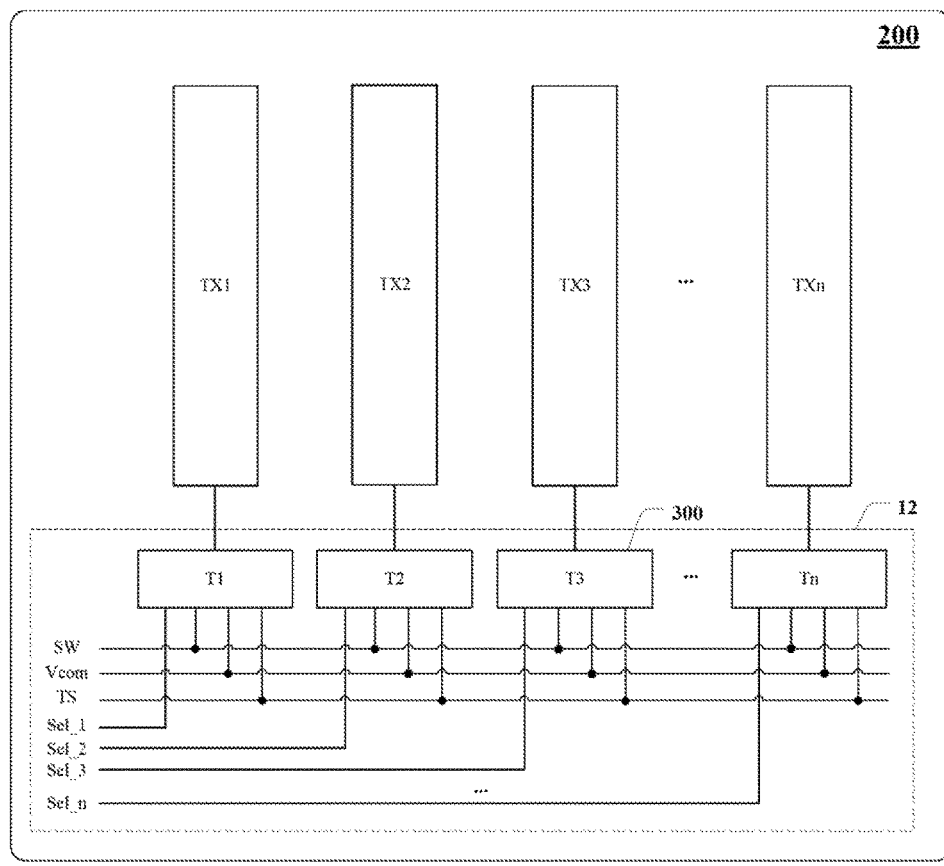
FIG. 2 illustrates a schematic diagram of an exemplary display panel consistent with disclosed embodiments.

FIG. 2 illustrates a schematic diagram of an exemplary display panel 200 consistent with disclosed embodiments. The similarities between FIG. 1 and FIG. 2 are not repeated here, while certain differences may be explained.

As shown in FIG. 2, the touch driving circuit 12 of the display panel 200 may include a plurality of driving units T1, T2, T3, . . . , Tn, a switching signal line SW, a touch scanning signal line TS, a common signal line Vcom, and a plurality of gate signal lines Sel_1, Sel_2, Sel_3, . . . , Sel_n respectively corresponding to the driving units T1, T2, T3, . . . , Tn. In particular, the output terminal of each driving unit T1, T2, T3, . . . , Tn may be electrically connected to the corresponding touch driving electrode TX1, TX2, TX3, . . . , TXn, respectively. Each driving unit T1, T2, T3, . . . , Tn may be electrically connected to the switching signal line SW, the touch scanning signal line TS, and the common signal line Vcom. Each driving unit T1, T2, T3, . . . , Tn may be electrically connected to the corresponding gate signal line Sel_1, Sel_2, Sel_3, . . . , Sel_n, respectively.

In the disclosed embodiments, under the control of the switching signal line SW and the corresponding gate signal line Sel_1, Sel_2, Sel_3, . . . , Sel_n eclectically connected to, one of the driving units T1, T2, T3, . . . , Tn may transmit the signal inputted from the touch scanning signal line TS to the corresponding touch driving electrode, while the other driving units may transmit the signal inputted from the common signal line Vcom to the other corresponding touch driving electrodes, respectively.

In each touch stage, for example, in touch stage i, under the control of the switching signal line SW and the corresponding gate signal line Sel_i, one of the driving units Ti may electrically connect the corresponding driving electrode TXi to the touch scanning signal line TS. Accordingly, the driving electrode TXi may receive the touch scanning signal transmitted from the scanning signal line TS. Meanwhile, under the control of the switching signal line SW and the corresponding gate signal lines, the other driving units (i.e., the driving units other than Ti) may electrically connect the corresponding driving electrode to the common signal line Vcom, respectively. Accordingly, the other driving electrodes (i.e., the driving electrodes other than TXi) may receive the common voltage signal transmitted from the common signal line Vcom. That is, the driving electrode TXi may receive the touch scanning signal, while the other driving electrode (i.e., the driving electrodes other than TXi) may receive the common voltage signal, where i=1, 2, . . . , n.

Further, in each display stage, under the control of the switching signal line SW and the corresponding gate signal line Sel_1, Sel_2, Sel_3, . . . , Sel_n eclectically connected to, each driving unit T1, T2, T3, . . . , Tn may electrically connect the touch driving electrode TX1, TX2, TX3, . . . , TXn to the common signal line Vcom. Accordingly, each touch driving electrode TX1, TX2, TX3, . . . , TXn may receive the common voltage signal transmitted from the common signal line Vcom. That is, each touch driving electrode TX1, TX2, TX3, . . . , TXn may be electrically connected to the common signal line Vcom.

In the disclosed embodiments, in each touch stage, the touch driving electrodes which do not perform the touch scanning may be electrically connected to the common signal line, such that when one touch driving electrode is performing the touch scanning, the other touch driving electrodes which do not perform the touch scanning may have an equal potential. Thus, the potential difference between the other touch driving electrodes which do not perform the touch scanning may be suppressed, and the brightness nonuniformity caused by the unequal potential between the touch driving electrodes may be prevented. Accordingly, the display performance may be enhanced.

Figure 3:
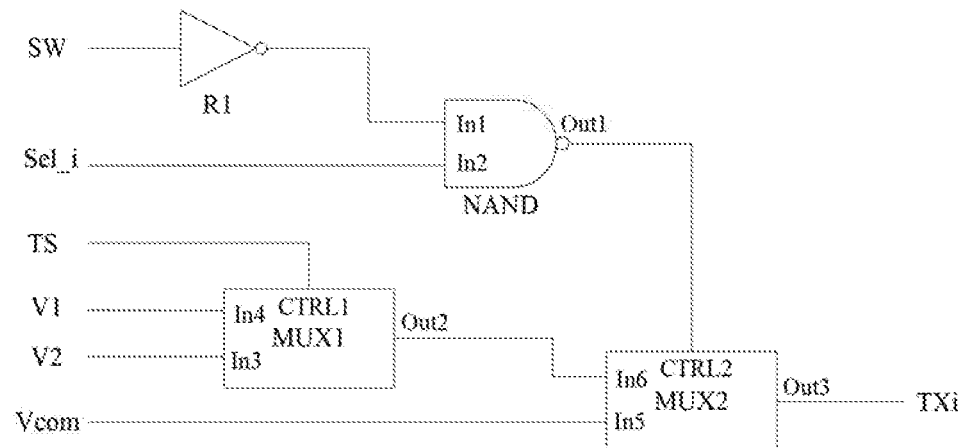
FIG. 3 illustrates a circuit diagram of an exemplary driving unit in an exemplary display panel consistent with disclosed embodiments.

FIG. 3 illustrates a circuit diagram of an exemplary driving unit 300 in an exemplary display panel in FIG. 2 consistent with disclosed embodiments. As shown in FIG. 3, the touch driving circuit 12 may further include a first voltage signal line V1 and a second voltage signal line V2. In particular, the first voltage signal line V1 and the second voltage signal line V2 may transmit a first voltage signal and a second voltage signal, respectively. The first voltage signal and the second voltage signal may be constant voltage signals, and the first voltage signal may provide a voltage different from the second voltage signal.

As shown in FIG. 3, the driving unit 300 may be any one of the driving units T1, T2, T3, . . . , Tn of the touch driving circuit 12 shown in FIG. 2. The driving unit 300 may include a first inverter R1, a negative-AND gate NAND, a first gate unit MUX1, and a second gate unit MUX2.

In particular, the negative-AND gate NAND may include a first input terminal In1, a second input terminal In2, and a first output terminal Out1. Under the control of the signal transmitted from the touch scanning signal line TS, the first gate unit MUX1 may be configured to gating a first voltage signal line V1 or a second voltage signal line V2. Under the control of the first output terminal Out1 of the negative-AND gate NAND, the second gate unit MUX2 may be configured to gating an output terminal of the first gate unit MUX1 or the common signal line Vcom.

The first gate unit MUX1 may include a first control terminal CTRL1, a third input terminal In3, a fourth input terminal In4, and a second output terminal Out2. The second gate unit MUX2 may include a second control terminal CTRL2, a fifth input terminal In5, a sixth input terminal In6, and a third output terminal Out3.

The first inverter R1 may have an input terminal of the first inverter R1 electrically connected to the switching signal line SW, and an output terminal electrically connected to the first input terminal In1 of the negative-AND gate NAND.

The negative-AND gate NAND may have the second input terminal In2 electrically connected to the corresponding gate signal line Sel_i, and the first output terminal Out1 electrically connected to the second control terminal CTRL2 of the second gate unit MUX2, where i=1, 2, . . . , n.

The first gate unit MUX1 may have the first control terminal CTRL1 electrically connected to the touch scanning signal line TS, the third input terminal In3 electrically connected to the first voltage signal line V1, the fourth input terminal In4 electrically connected to the second voltage signal line V2, and the second output terminal Out2 electrically connected to the sixth input terminal In6 of the second gate unit MUX2.

The second gate unit MUX2 may have the fifth input terminal In5 electrically connected to the common voltage signal line Vcom, and the third output terminal Out3 electrically connected to the output terminal of the driving unit 300. Meanwhile, the output terminal of the driving unit 300 may also be electrically connected to the corresponding touch driving electrode TXi.

In the driving unit 300, when the first control terminal CTRL1 of the first gate unit MUX1 is provided with a first potential, the first gate unit MUX1 may electrically connect the third input terminal In3 and the second output terminal Out2. When the first control terminal CTRL1 of the first gate unit MUX1 is provided with a second potential, the first gate unit MUX1 may electrically connect the fourth input terminal In4 and the second output terminal Out2.

On the other hand, when the second control terminal CTRL2 of the second gate unit MUX2 is provided with the first potential, the second gate unit MUX2 may electrically connect the fifth input terminal In3 and the third output terminal Out3. When the second control terminal CTRL2 of the second gate unit MUX2 is provided with the second potential, the second gate unit MUX2 may electrically connect the sixth input terminal In6 and the third output terminal Out3.

Figure 4:
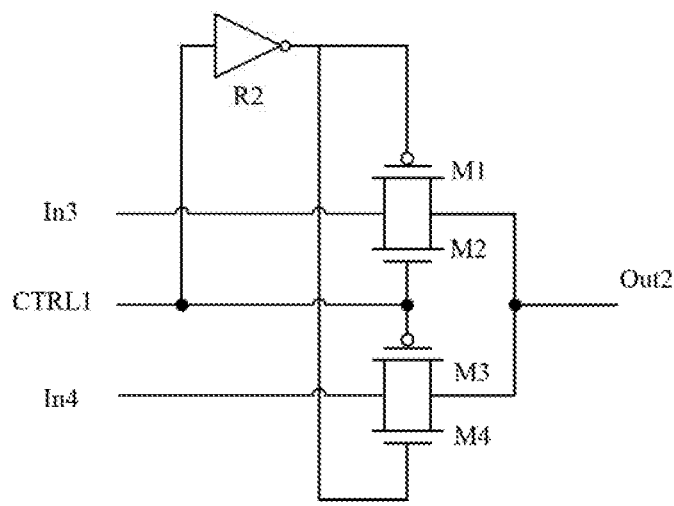
FIG. 4 illustrates a circuit diagram of an exemplary first gate unit in an exemplary driving unit consistent with disclosed embodiments.

FIG. 4 illustrates a circuit diagram of an exemplary first gate unit 400 in an exemplary driving unit consistent with disclosed embodiments. As shown in FIG. 4, the first gate unit 400 may be the first gate unit MUX1 shown in FIG. 3. The first gate unit 400 may include a second inverter R2, a first transistor M1, a second transistor M2, a third transistor M3, and a fourth transistor M4.

The second inverter R2 may have an input terminal electrically connected to the first control terminal CTRL1, and an output terminal electrically connected to the gate of the first transistor M1 and the gate of the fourth transistor M4. The gate of the second transistor M2 and the gate of the third transistor M3 may be electrically connected to the first control terminal CTRL1, respectively. The first electrode of the first transistor M1 and the first electrode of the second transistor M2 may be electrically connected to the third input terminal In3, respectively.

The first electrode of the third transistor M3 and the first electrode of the fourth transistor M4 may be electrically connected to the fourth input terminal In4, respectively. The second electrode of the first transistor M1, the second electrode of the second transistor M2, the second electrode of the third transistor M3, and the second electrode of the fourth transistor M4 may be electrically connected to the second output terminal Out2, respectively.

In particular, the first transistor M1 and the second transistor M2 may have different types of channels, while the first transistor M1 and the third transistor M3 may have the same type of channels, and the transistor M2 and the fourth transistor M4 may also have the same type of channels.

In one embodiment, as shown in FIG. 4, the first transistor M1 and the third transistor M3 may be P-type transistors, and the second transistor M2 and the fourth transistor M4 may be N-type transistors. The third input terminal In3 of the first gate unit 400 may be electrically connected to the first voltage signal line V1, and the fourth input terminal In4 of the first gate unit 400 may be electrically connected to the second voltage signal line V2.

In the first gate unit 400, when the first control terminal CTRL1 is provided with a high potential or a high-level signal, the first transistor M1 and the second transistor M2 may be turned on, such that the signal at the first voltage signal line V1 may be transmitted to the second output terminal Out2. When the first control terminal CTRL1 is provided with a low potential or a low-level signal, the third transistor M3 and the fourth transistor M4 may be turned on, such that the signal at the second voltage signal line V2 may be transmitted to the second output terminal Out2.

Provided that the first voltage signal transmitted from the first voltage signal line V1 is a high-level signal and, meanwhile, the second voltage signal transmitted by the second voltage signal line V2 is a low-level signal, when the first control terminal CTRL1 is at a high level, the output terminal Out2 may output a high-level signal, and when the second control terminal CTRL2 is at a low level, the second output terminal Out2 may output a low-level signal.

Figure 5:
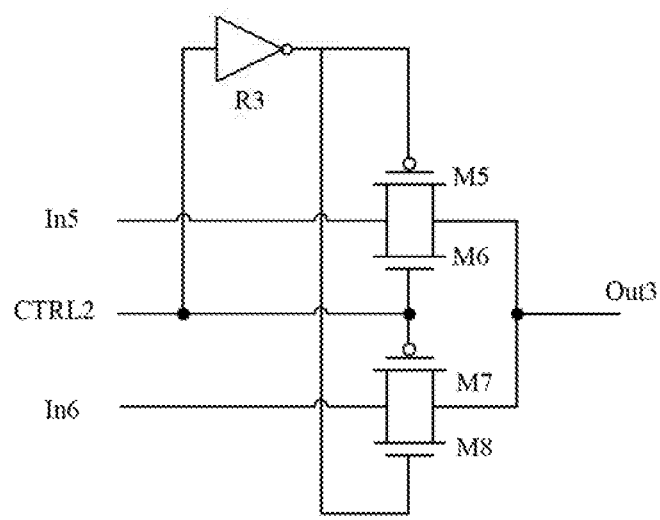
FIG. 5 illustrates a circuit diagram of an exemplary second gate unit in an exemplary driving unit consistent with disclosed embodiments.

FIG. 5 illustrates a circuit diagram of an exemplary second gate unit 500 in an exemplary driving unit consistent with disclosed embodiments. As shown in FIG. 5, the second gate unit 500 may be a second gate unit MUX2 shown in FIG. 3. The second gate unit 500 may include a third inverter R3, a fifth transistor M5, a sixth transistor M6, a seventh transistor M7, and an eighth transistor M8.

The third inverter R3 may have an input terminal electrically connected to the second control terminal CTRL2, and an output terminal respectively electrically connected to the gate of the fifth transistor M5 and the gate of the eighth transistor M8. The gate of the sixth transistor M6 and the gate of the seventh transistor M7 may be electrically connected to the second control terminal CTRL2, respectively. The first electrode of the fifth transistor M5 and the first electrode of the sixth transistors M6 may be electrically connected to the fifth input terminals In5, respectively.

The first electrode of the seventh transistor M7 and the first electrode of the eighth transistor M8 may be electrically connected to the sixth input terminal In6, respectively. The second electrode of the fifth transistor M5, the second electrode of the sixth transistor M6, the second electrode of the seventh transistor M7, and the second electrode of the eighth transistor M8 may be electrically connected to the third output terminal Out3, respectively.

In particular, the fifth transistor M5 and the sixth transistor M6 may have different types of channels, the fifth transistor M5 and the seventh transistor M7 may have the same type of channels, and the sixth transistor M6 and the eighth transistor M8 may also have the same type of channels, In one embodiment, as shown in FIG. 5, the fifth transistor M5 and the seventh transistor M7 may be P-type transistors, and the sixth transistor M6 and the eighth transistor M8 may be N-type transistors. The fifth input terminal In5 of the second gate unit 500 may be electrically connected to the common signal line Vcom, and the sixth input terminal In6 of the second gate unit 500 may be electrically connected to the output terminal Out2 of the first gate unit MUX1 (e.g., the first gate unit 400 shown in FIG. 4).

In the second gate unit 500, when the second control terminal CTRL2 is provided with a high potential or a high-level signal, the fifth transistor M5 and the sixth transistor M6 may be turned on, and the signal at the common signal line may be transmitted to the third output terminal Out3. When the second control terminal CTRL2 is provided with a low potential or a low-level signal, the seventh transistor M7 and the eighth transistor M8 may be turned on, and the signal outputted from the second output terminal Out2 of the first gate unit MUX1 (e.g., the first gate unit 400 shown in FIG. 4) may be transmitted to the third output terminal Out3 of the second gate unit 500.

Referring to FIGS. 3-5, when the touch scanning signal line TS inputs a first periodic pulse signal, the first gate unit MUX1 may output a second periodic pulse signal via the second output terminal Out2. The second periodic pulse signal may have the same frequency and the same phase as the first periodic pulse signal. The first level of the second periodic pulse signal may be equal to the signal level provided by the first voltage signal line V1, and the second level of the second periodic pulse signal may be equal to the signal level provided by the second voltage signal line V2.

When the switching signal line SW transmits a high-level signal, the second control terminal CTRL2 may be provided with a high potential, and the second gate unit MUX2 may gating the common signal line Vcom, thereby transmitting the common voltage signal to the touch driving electrodes TX1, TX2, TX3, . . . TXn, respectively. When the switching signal line SW transmits a low-level signal, in the touch driving circuit electrically connected to the touch driving electrode TXi, the signal outputted from the first output terminal Out1 of the negative-AND gate NAND and the signal transmitted by the corresponding gate signal line Sel_i may be inverted signals.

That is, when the selection signal line Sel_i is provided with a high-level signal, the first output terminal Out1 may output a low-level signal. At this moment, the second gate unit MUX2 may gating the second output terminal Out2 and transmit the second periodic pulse signal outputted from the second output terminal Out2 to the corresponding touch driving electrode TXi.

On the other hand, when the gate signal line Sel_i is provided with a low-level signal, the first output terminal Out1 may output a high-level signal. At this moment, the second control terminal CTRL2 may receive a high-level signal, and the second gate unit MUX2 may gating the common signal line Vcom, thereby transmitting the common voltage signal to the corresponding touch driving electrode TXi, where i=1, 2, . . . , n.

Thus, when the switch signal line SW is provided with a low-level signal and the gate signal line Sel_i is provided with a high-level signal, the touch driving circuit may provide the second periodic pulse signal to the corresponding touch driving electrode TXi. When the switch signal line SW is provided with a low-level signal and the gate signal line Sel_i is provided with a low-level signal, the touch driving circuit may provide the common voltage signal to the corresponding touch driving electrode TXi.

Then in each touch stage, the switching signal line SW may be provided with a low-level signal, while the gate signal line Sel_i, which electrically connected to the touch scanning driving electrode TXi being currently scanned, may be provided with a high-level signal. Thus, the touch driving circuit Ti may output a periodic signal to the corresponding touch driving electrode TXi, in which the periodic signal outputted to the corresponding touch driving electrode TXi may have the same frequency and the same phase as the period signal provided by the touch scanning signal line TS. Meanwhile, the other touch driving circuits (i.e., touch driving circuits other than Ti) may output the common voltage signal to the corresponding touch driving electrodes (i.e., touch driving electrodes other than TXi) electrically connected to the other touch driving circuits.

In each display stage, the switching signal line SW may be provided with a high-level signal, and the driving units T1, T2, . . . , Tn may transmit the common voltage signal to the corresponding touch driving electrodes TX1, TX2, . . . , TXn.

It should be noted that, the common voltage signal may be a signal having a constant voltage value. The high level and the low level merely represents the relative state of the signal level, and the high potential and the low potential merely represent the relative states of the potential. In practical applications, the high level may be a signal level at which the N-type transistor and the P-type transistor in the disclosed touch driving circuit may be turned on and turned off respectively. The low level may be a signal level at which the P-type transistor and the N-type transistor in the disclosed touch driving circuit may be turned on and turned off, respectively. The high potential may be a voltage potential at which the N-type transistor and the P-type transistor in the disclosed touch driving circuit may be turned on and turned off, respectively. The low potential may be a voltage potential at which the P-type transistor and the N-type transistor in the disclosed touch driving circuit may be turned on and turned off, respectively.

Figure 6:
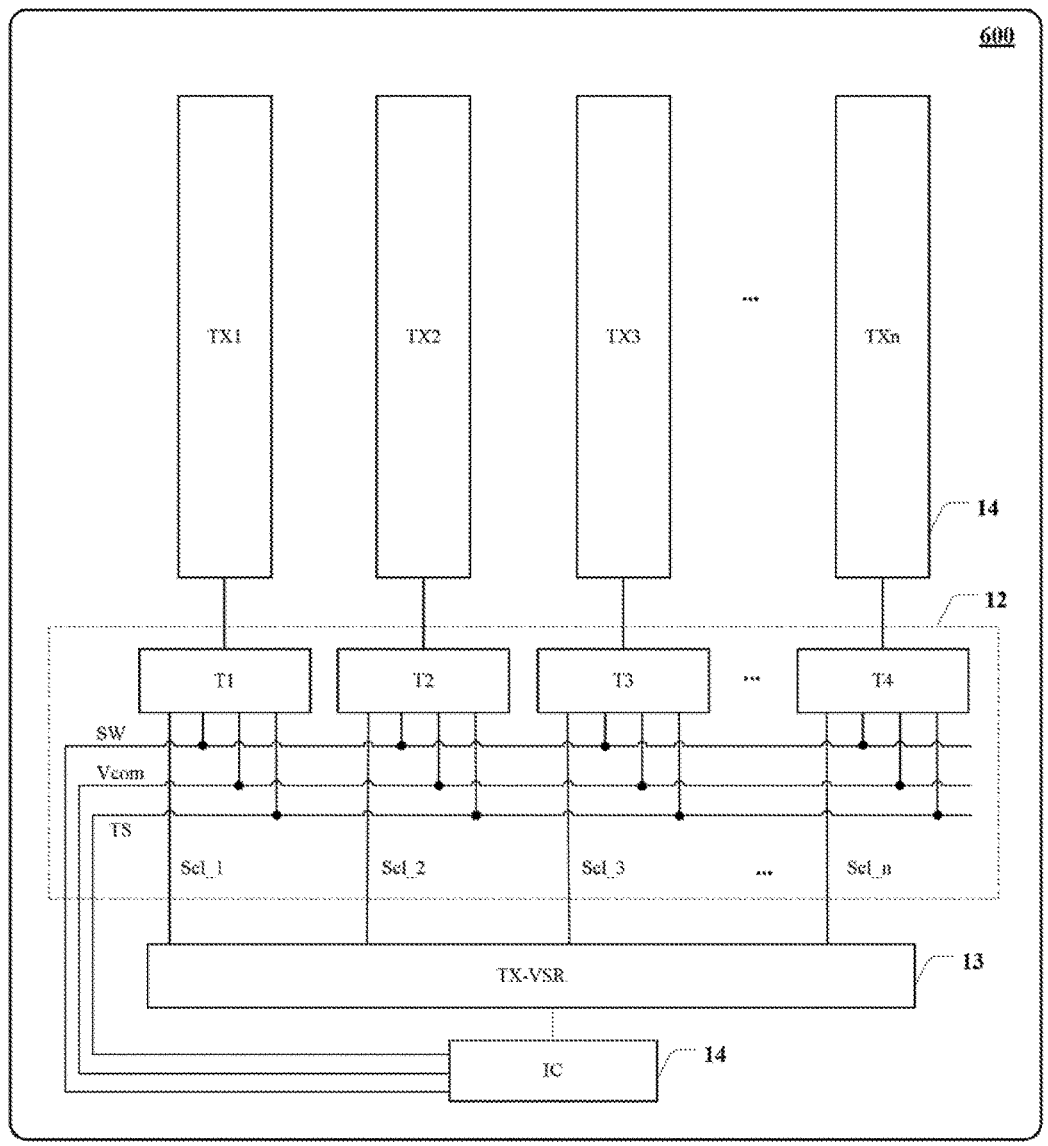
FIG. 6 illustrates a schematic diagram of another exemplary display panel consistent with disclosed embodiments.

In certain embodiments, the display panel may also be provided with a driving chip and other driving circuits, which may be configured to control the operating state of the touch driving circuit. FIG. 6 illustrates a schematic diagram of another exemplary display panel 600 consistent with disclosed embodiments. The similarities between FIG. 6 and FIG. 2 are not repeated here, while certain differences may be explained.

As shown in FIG. 6, the display panel 600 may further include a touch shifting circuit 13 and a driving chip 14, in addition to the various components included in the display panel 200 shown in FIG. 2. In particular, the touch shifting circuit 13 may be electrically connected to each of the gate signal lines Sel_1, Sel_2, Sel_3, . . . , Sel_n for sequentially providing the gating signals to the gate signal lines Sel_1, Sel_2, Sel_3, . . . , Sel_n. The driving chip 14 may be electrically connected to the switching signal line SW, the touch scanning signal line TS, the common signal line Vcom, and the touch shifting circuit 13.

In the disclosed embodiments, under the control of the driving chip 14, the touch shifting circuit 13 may sequentially provide a touch shifting signal to each of the gate signal lines Sel_1, Sel_2, Sel_3, . . . , Sel_n. The touch shifting signal may be a single pulse signal, and the single pulse signal received by the (i+1)-th gate signal lines Sel_i+1 may be delayed by the period of one single pulse signal with respect to the single pulse signal received by the i-th gate signal lines Sel_i. Thus, the driving units T1, T2, T3, . . . , Tn may sequentially transmit the pulse signal, which has the same frequency and phase as the pulse signal provided by the touch scanning signal line TS, to the corresponding touch electrode TX1, TX2, TX3, . . . , TXn.

Further, the touch shifting circuit 13 may include a plurality of cascaded touch shifting units, in which each touch shifting unit may have an output terminal electrically connected to the corresponding gate signal line. The first-stage touch shifting unit may receive an initial triggering signal provided by the driving chip, and the second-stage touch shifting unit to the last-stage touch shifting unit may receive a shifting signal provided by the touch shifting unit one-stage higher as a triggering signal, and output the triggering signal after being shifted. Each touch shifting unit may include any existing shift registers, which will not be described here.

Figure 7:
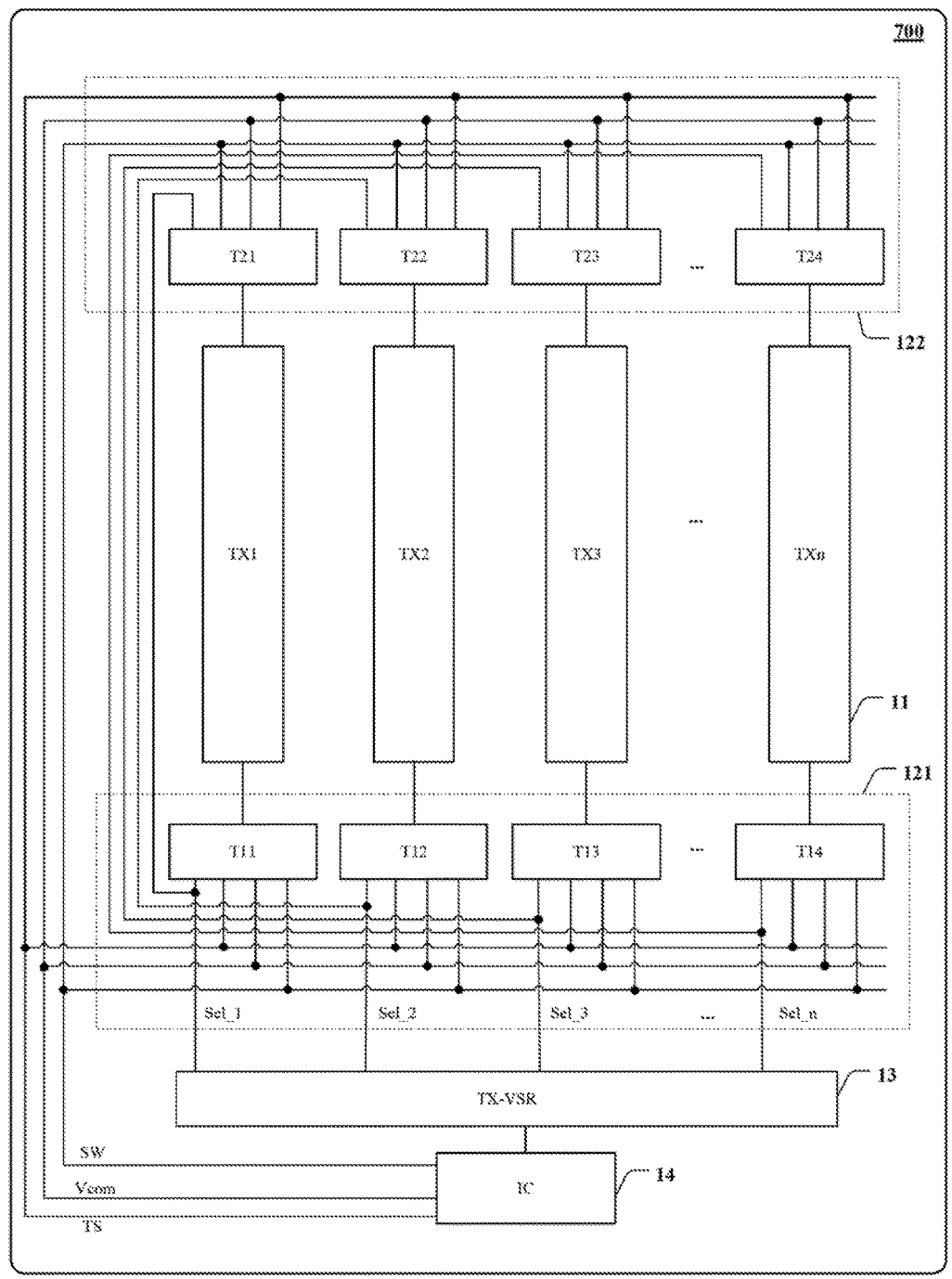
FIG. 7 illustrates a schematic diagram of another exemplary display panel consistent with disclosed embodiments.

FIG. 7 illustrates a schematic diagram of another exemplary display panel 700 consistent with disclosed embodiments. The similarities between FIG. 6 and FIG. 7 are not repeated here, while certain differences may be explained.

As shown in FIG. 7, different from the display panel 600 shown in FIG. 6, the display panel 700 shown in FIG. 7 may include two touch driving circuits 121 and 122, each of which may be the same as the touch driving circuit 12 shown in FIG. 2 or FIG. 6. The touch driving electrode TX1, TX2, TX3, . . . , TXn may have various shapes, according to different application scenarios.

In one embodiment, as shown in FIG. 6, the touch driving electrode TX1, TX2, TX3, . . . , TXn may be a striped electrode extending in a first direction. Each touch driving electrode TX1, TX2, TX3, . . . , TXn may have two ends in the first direction or the extending direction, and the two touch driving circuits 121 and 122 may be electrically connected to the touch driving electrode TX1, TX2, TX3, . . . , TXn at the two ends, respectively.

Both touch driving circuits 121 and 122 may be electrically connected to the touch shifting circuit 13 and the driving chip 14, and the touch shifting circuit 13 and the driving chip 14 may provide the same signal to the touch driving circuits 121 and 122. The touch driving circuits 121 and 122 may transmit the same driving signal to the touch driving electrode from both ends, respectively.

Compared to the display panel shown in FIG. 6, the display panel 700 shown in FIG. 7 may be able to provide the driving signal to the touch driving electrodes by two touch driving circuits at the same time, such that the driving capability may be improved and, meanwhile, the signal nonuniformity across the same touch driving electrode caused by the substantially large resistance of the touch driving electrode may be suppressed. Accordingly, the accuracy of the touch detection may be improved, and the display performance may be enhanced.

Figure 8:
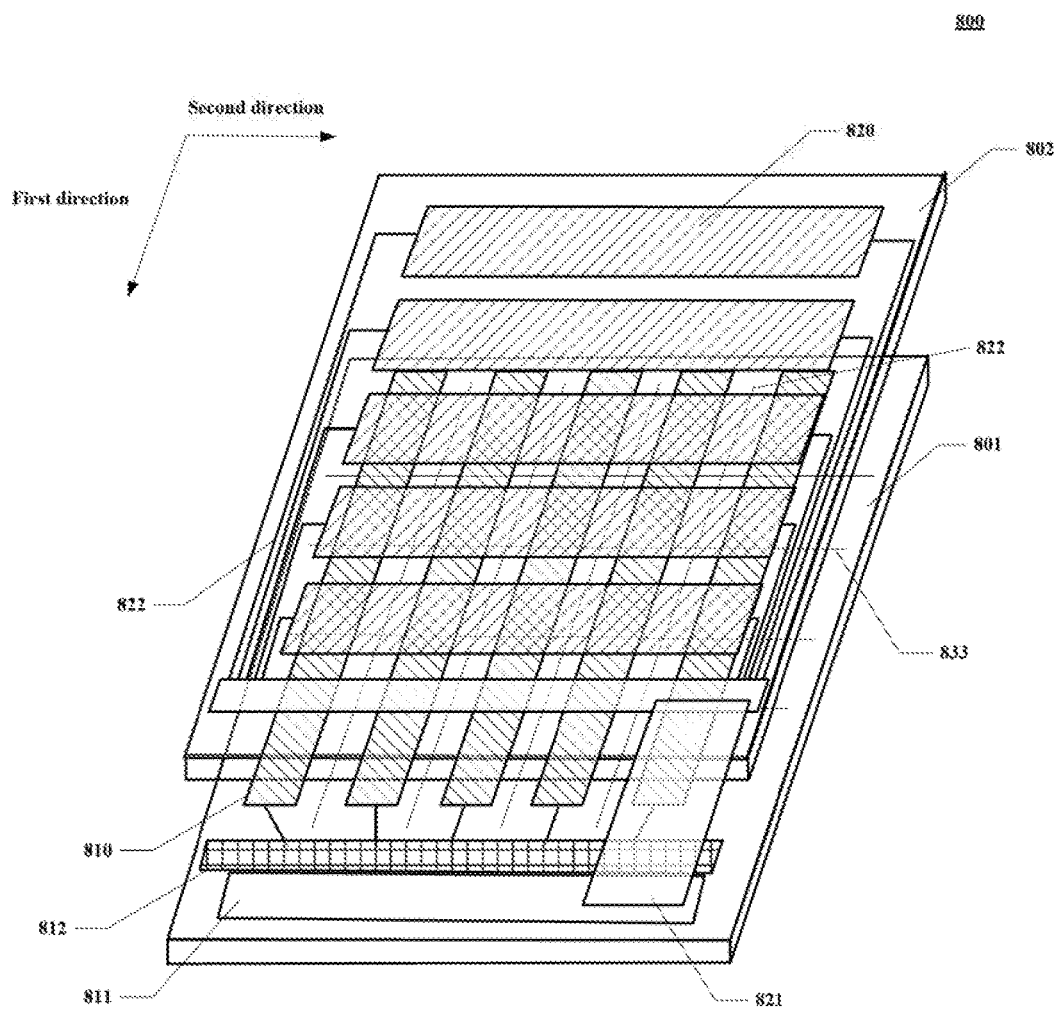
FIG. 8 illustrates a schematic diagram of another exemplary display panel consistent with disclosed embodiments.

The disclosed display panels may be implemented into a touchscreen display based on mutual capacitance. FIG. 8 illustrates a schematic diagram of another exemplary display panel 800 consistent with disclosed embodiments. As shown in FIG. 8, the display panel 800 may include an array substrate 801, a color film substrate 802 disposed opposite to the array substrate 801, a plurality of touch driving electrodes 810, a touch driving circuit 812, a plurality of touch sensing electrodes 810, a plurality of touch signal lines 822, a driving chip 811, and a flexible circuit board 821. Other appropriate components may also be included.

In particular, the plurality of touch driving electrodes 810 and the touch driving circuit 812 may be disposed on the array substrate 801. The touch driving electrodes 810 and the touch driving circuit 812 may be any touch driving electrode and any touch driving circuit described in the disclosed embodiments. The touch driving electrodes 810 may extend in a first direction and, meanwhile, may be arranged in a second direction, in which the first direction may intersect the second direction. The first direction and the second direction in FIG. 8 are for illustrative purposes and are not intended to limit the scope of the present disclosure.

The plurality of touch sensing electrodes 820 may be disposed on the color film substrate 802. The touch sensing electrodes 820 may extend in a direction intersecting the extending direction of the touch driving electrode 810 (i.e., the first direction). For example, the touch sensing electrodes 820 may extend in the second direction and, meanwhile, may be arranged in the first direction. The number and the shape of the touch driving electrodes shown in FIG. 8 are for illustrative purposes and are not intended to limit the scope of the present disclosure.

Further, a plurality of data lines 822 and a plurality of scanning lines 833 (not drawn in FIG. 8) may be disposed on the array substrate 801. The data line 822 may extend in the first direction, and the scanning line 833 extend in the second direction.

The display panel 800 may further include the flexible circuit board 821, while the array substrate 801 may further includes the driving chip 811. The plurality of touch signal lines 822 may be disposed on the color film substrate 802, and the touch driving electrode 820 may be electrically connected to the flexible circuit board 821 through the corresponding touch signal line 822. The flexible circuit board 821 may be electrically connected to the driving chip 811.

Thus, the touch signal lines 822, which are disposed on the color film substrate and electrically connected to the corresponding touch sensing electrodes 820, may be first electrically connected to the flexible circuit board 821, then electrically connected to the driving chip 811 through the flexible circuit board 821. Thus, the driving chip 811 may be able to receive the signal provided by the touch sensing electrodes 820.

The present disclosure also provides a driving method for the disclosed display panels. The driving method may be a time-divisional driving, which includes a plurality of display stages and a plurality of touch stages. The driving method may comprise: in each display stage, the touch driving circuit may provide the common voltage signal to the touch driving electrodes; and in each touch stage, the touch driving circuit may provide the touching scanning signal to one touch driving electrode and, meanwhile, provide the common voltage signal to the other touch driving electrodes.

In one embodiment, the touch driving circuit 12 shown in FIG. 2 may be adopted to realize the driving method. As describe above, the touch driving circuit 12 shown in FIG. 2 may include a plurality of driving units, a switching signal line, a touch scanning signal line, a common signal line, and a plurality of gate signals one-to-one corresponding to the driving units. Each driving unit may be electrically connected to the switching signal line, the touch scanning signal line, the common signal line, and the corresponding gate signal line. Each driving unit may have an output terminal electrically connected to the corresponding touch driving electrode.

Given the touch driving circuit 12 shown in FIG. 2, the driving method may further comprise the following. In the display stage, the switching signal line may be provided with a first level signal, the common signal line may be provided with the common voltage signal, and each touch driving unit may provide the common voltage signal to the corresponding touch driving electrode.

In each touch stage, the switching signal line may be provided with a second level signal, the common signal line may be provided with the common voltage signal, and the touch scanning signal line may be provided with the touch driving signal. One of the plurality of gate signal lines may be provided with the first level signal, and the corresponding driving unit may transmit the touch driving signal to the touch driving electrode, which is electrically connected to the corresponding driving unit. The second level signal may be provided to the other gate signal lines, and the driving units corresponding to the other gate signal lines may transmit the common voltage signal to the other touch driving electrodes electrically connected to the other driving units, respectively.

That is, in each touch stage, one of the plurality of gate signal lines may be provided with the first level signal. The gate signal line provided with the first level signal may be called as a selected gate signal line, the driving unit corresponding to the selected gate signal line may be called a selected driving unit, and the touch driving electrode electrically connected to the selected driving unit may be called as a selected touch driving electrode. The gate signal line provided with the second level signal may be called as a non-selected gate signal line, the driving unit corresponding to the non-selected gate signal line may be called a non-selected driving unit, and the touch driving electrode electrically connected to the non-selected driving unit may be called as a non-selected touch driving electrode.

Thus, when the selected gate signal line is provided with the first level signal, the selected driving unit may transmit the touch driving signal to the selected touch driving electrode. Meanwhile, the non-selected gate signal lines are provided with the second level signal, and the non-selected driving units may transmit the common voltage signal to the corresponding non-selected touch driving electrodes, respectively.

Further, the first and second level signal, and the touch driving signal may have various waveform according to various application scenarios. In one embodiment, the first and second level signal may be a high-level signal and a low-level signal, respectively. In another embodiment, the first and second level signal may be a low-level signal and a high-level signal, respectively. In certain embodiments, the touch driving signal may be a periodic pulse signal.

Figure 9:
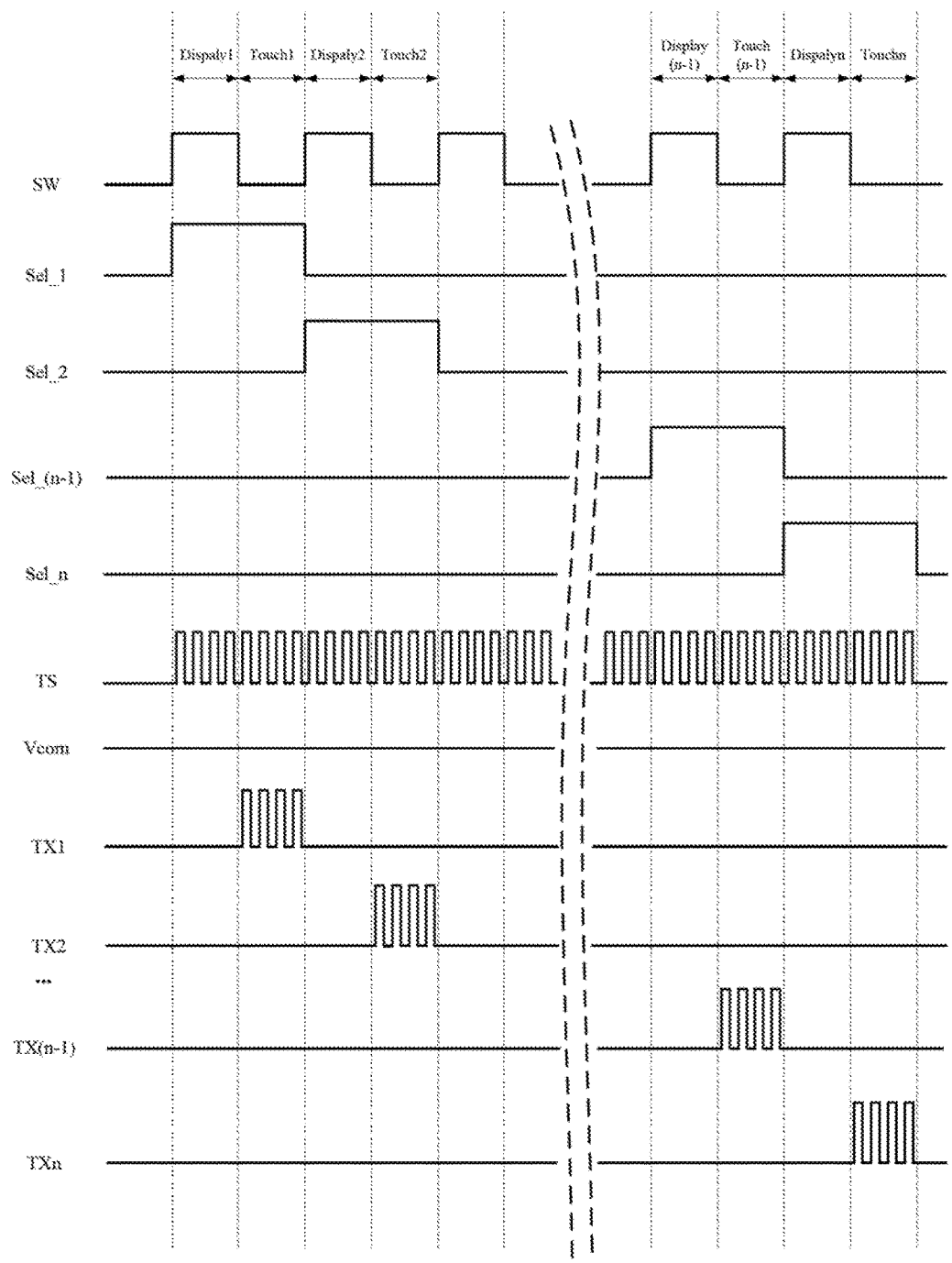
FIG. 9 illustrates an exemplary driving scheme of an exemplary display panel consistent with disclosed embodiments.

FIG. 9 illustrates an exemplary driving scheme of an exemplary display panel consistent with disclosed embodiments, in which the display panel may be any of the disclosed display panels.

FIG. 9 illustrates the driving scheme of the display panel in one frame period. As shown in FIG. 9, one frame period may include at least n display stages Display_1, Display_2, Display_3, . . . , Display_n and n touch stages Touch_1, Touch_2, Touch_3, . . . , Touch_n, where n is the number of the touch driving electrodes. SW denotes the signal at the switching signal line. Sel_1, Sel_2, . . . , Sel_(n−1), Sel_n denote the signal at the gate signal lines Sel_1, Sel_2, . . . , Sel_(n−1), Sel_n, respectively. TS denotes the signal at the touch scanning signal line, and Vcom the signal at the common signal line. TX1, TX2, . . . , TX(n−1), TXn denote the signals received by the touch driving electrodes TX1, TX2, . . . , TX(n−1), TXn, respectively.

In each display stages Display_1, Display_2, Display_3, . . . , Display_n, the switching signal line may be provided with the first level signal. At this moment, each driving unit may electrically connect the corresponding touch driving electrode TX1, TX2, . . . , TX(n−1), TXn to the common signal line, and each touch driving electrode TX1, TX2, . . . , TX(n−1), TXn may receive the common voltage signal, respectively.

In the first touch stage Touch_1, the switching signal line may be provided with the second level signal and, meanwhile, the first gate signal line Sel_1 may be provided with the first level signal, while the other gate signal lines Sel_2, . . . , Sel_(n−1), Sel_n may be provided with the second level signal. At this moment, according to the touch scanning signal transmitted by the touch scanning signal line TS, the first driving unit may transmit the periodic pulse signal to the first touch driving electrode TX1, while the other driving units may transmit the common voltage signal to the other touch driving electrodes TX2, . . . , TX(n−1), TXn. In one embodiment, the first level signal may be a high-level signal, the second level signal and the common voltage signal may be low-level signals.

In the second touch stage Touch_2, the switching signal line may be provided with the second level signal and, meanwhile, the second gate signal line Sel_2 may be provided with the first level signal, while the other gate signal lines Sel_1, Sel_3, . . . , Sel_(n−1), Sel_n may be provided with the second level signal. At this moment, according to the touch scanning signal transmitted by the touch scanning signal line TS, the second driving unit may transmit the periodic pulse signal to the second touch driving electrode TX2, while the other driving units may transmit the common voltage signal to the other touch driving electrodes TX1, TX3, . . . , TX(n−1), TXn.

Accordingly, in the n-th touch stage Touch_n, the switching signal line may be provided with the second level signal and, meanwhile, the n-th gate signal line Sel_n may be provided with the first level signal, while the other gate signal lines Sel_1, Sel_2, . . . , Sel_(n−1) may be provided with the second level signal. At this moment, according to the touch scanning signal transmitted by the touch scanning signal line TS, the n-th driving unit may transmit the periodic pulse signal to the n-th touch driving electrode TXn, while the other driving units may transmit the common voltage signal to the other touch driving electrodes TX1, TX2, . . . , TX(n−1).

Further, as shown in FIG. 9, in one frame period, the switching signal line may be provided with the first periodic pulse signal, the gate signal lines Sel_1, Sel_2, . . . , Sel_(n−1), Sel_n may be sequentially provided with a single pulse signal, in which the single pulse signal may have a pulse width equal to one period of the first periodic pulse signal. That is, the pulse width of the single pulse signal may be equal to the period of the first periodic pulse signal.

In the disclosed driving method, each of the touch driving electrode TX1, TX2, . . . , TX(n−1), TXn may performs one touch scanning in each of the n touching stages, respectively, and the periodic pulse signal received by each touch driving electrode may have the same frequency and phase as the pulse signal transmitted by the touch scanning signal line TS. Thus, one touch scanning of the entire display panel may be completed in one frame period.

Further, the driving chip in the display panel may be able to receive a signal returned by the touch sensing electrode in each touching stage, and determine a touching position based on the signal returned by the touch sensing electrode.

Figure 10:
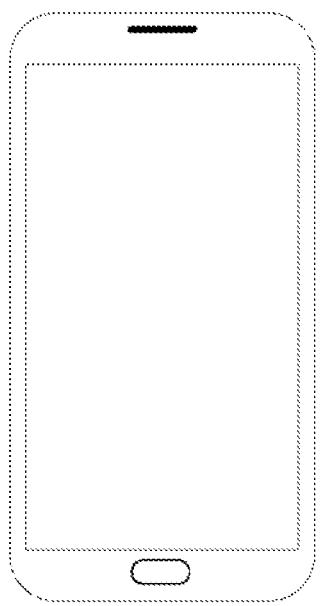
FIG. 10 illustrates an exemplary display device consistent with disclosed embodiments.

The present disclosure also provides a display device. FIG. 10 illustrates an exemplary display device consistent with disclosed embodiments. As shown in FIG. 10, the display device 100 may comprise any of the disclosed display panels. Those skilled in the art should understand that, in addition to the disclosed display panel, the display device 1000 may also include any appropriate components, such as a backlight, a light guide plate, a liquid crystal layer disposed between the array substrate and the color film substrate, an alignment film, and a protective glass, etc., which are not further explained here.

The disclosed display device may be a cell phone, a tablet, a monitor, and a smart wearable display device, etc. Any display device comprising any of the disclosed display panels will fall within the scope of the present disclosure. Although a smart phone is shown FIG. 10, the disclosed display device is not limited to the smart phone.

In the disclosed emboldens, the touch panel may comprise a plurality of touch driving electrodes and at least one touch driving circuit, and the touch driving circuit may be electrically connected to the touch driving electrodes. The touch driving circuit may drive the display panel to enter a plurality of touch stages in one frame period, and in each touch stage, the touch driving circuit may further provide a touch scanning signal to one of the plurality of touch driving electrode and, meanwhile provide common voltage signal to the other touch driving electrodes.

That is, during the touch scanning, the display panel may configure the touch driving electrodes which are not being scanned to be at the same potential, such that the nonuniform brightness caused by different potentials at different touch driving electrodes may be suppressed, and the display performance may be enhanced.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A display panel, comprising:
a plurality of touch driving electrodes; and
at least one touch driving circuit electrically connected to the plurality of touch driving electrodes,
wherein the at least one touch driving circuit drives the display panel to enter a plurality of touch stages in one frame period, the one frame period includes a plurality of touch stages and a plurality of display stages,
in a touch stage, the at least one touch driving circuit provides a touch scanning signal to one of the plurality of touch driving electrodes and, meanwhile provides a common voltage signal to the other touch driving electrodes,
wherein the at least one touch driving circuit further includes:
a plurality of driving units one-to-one corresponding to the plurality of touch driving electrodes,
a switching signal line,
a touch scanning signal line,
a common signal line, and
a plurality of gate signal lines one-to-one corresponding to the plurality of driving units,
wherein a driving unit is electrically connected to the switching signal line, the touch scanning signal line, the common signal line, and a corresponding gate signal line,
an output terminal of the driving unit is electrically connected to a corresponding touch driving electrode, and
controlled by a signal inputted by the switching signal line and a signal inputted by a corresponding gate signal line, the driving unit transmits at least one of a signal inputted by the touch scanning signal line and a signal inputted from the common signal line to the corresponding touch driving electrode.

2. The display panel according to claim 1, wherein:
the at least one touch driving circuit further includes:
a first voltage signal line and a second voltage signal line; and
the driving unit further includes:
a first inverter including an input terminal and an output terminal;
a NAND gate including a first input terminal, a second input terminal, and a first output terminal,
a first gate unit including a first control terminal, a third input terminal, a fourth input terminal, and a second output terminal, and
a second gate unit including a second control terminal, a fifth input terminal, a sixth input terminal, and a third output terminal,
wherein the input terminal of the first inverter is electrically connected to the switching signal line, and the output terminal of the first inverter is electrically connected to the first input terminal of the NAND gate,
the second input terminal of the NAND gate is electrically connected to the corresponding gate signal line, and the first output terminal of the NAND gate is electrically connected to the second control terminal of the second gate unit,
the first control terminal of the first gate unit is electrically connected to the touch scanning signal line, the third input terminal of the first gate unit is electrically connected to the first voltage signal line, the fourth input terminal of the first gate unit is electrically connected to the second voltage signal line, and the second output terminal of the first gate unit is electrically connected to the sixth input terminal of the second gate unit, and the fifth input terminal of the second gate unit is electrically connected to the common voltage signal line, and the third output terminal of the second gate unit is electrically connected to an output terminal of the driving unit.

3. The display panel according to claim 2, wherein the first gate unit further includes a second inverter, a first transistor, a second transistor, a third transistor, and a fourth transistor, wherein:

an input terminal of the second inverter is electrically connected to the first control terminal, and an output terminal of the second inverter is electrically connected to a gate of the first transistor and a gate of the fourth transistor;

a gate of the second transistor and a gate of the third transistor are electrically connected to the first control terminal, respectively;

a first electrode of the first transistor and a first electrode of the second transistor are electrically connected to the third input terminal, respectively;

a first electrode of the third transistor and a first electrode of the fourth transistor are electrically connected to the fourth input terminal, respectively;

a second electrode of the first transistor, a second electrode of the second transistor, a second electrode of the third transistor, and a second electrode of the fourth transistor are electrically connected to the second output terminal, respectively, wherein, the first transistor and the second transistor have different types of channels, while the first transistor and the third transistor have a same type of channels, and the transistor and the fourth transistor have a same type of channels.

4. The display panel according to claim 2, wherein the second gate unit further includes a third inverter, a fifth transistor, a sixth transistor, a seventh transistor, and an eighth transistor, wherein:

an input terminal of the third inverter is electrically connected to the second control terminal, and an output terminal of the third inverter is respectively electrically connected to agate of the fifth transistor and a gate of the eighth transistor;

a gate of the sixth transistor and a gate of the seventh transistor is electrically connected to the second control terminal, respectively;

a first electrode of the fifth transistor and a first electrode of the sixth transistors is electrically connected to the fifth input terminals, respectively;

a first electrode of the seventh transistor and a first electrode of the eighth transistor is electrically connected to the sixth input terminal, respectively; and a second electrode of the fifth transistor, a second electrode of the sixth transistor, a second electrode of the seventh transistor, and a second electrode of the eighth transistor is electrically connected to the third output terminal, respectively, wherein the fifth transistor and the sixth transistor have different types of channels, the fifth transistor and the seventh transistor have a same type of channels, and the sixth transistor and the eighth transistor have a same type of channels.

5. The display panel according to claim 1, further including:

a touch shifting circuit electrically connected to each gate signal line, and configured to sequentially provide a gating signal to the gate signal lines.

6. The display panel according to claim 5, further including:

a driving chip electrically connected to the switching signal line, the touch scanning signal line, the common signal line, and the touch shifting circuit.

7. The display panel according to claim 1, further including:

a second touch driving circuit, wherein the touch driving electrode is a striped electrode, and the at least one touch driving circuit and the second touch driving circuit are respectively electrically connected to the touch driving electrode at two ends arranged in an extending direction of the touch driving electrode.

8. The display panel according to claim 1, further including:

an array substrate; and a color film substrate disposed opposite to the array substrate, wherein the plurality of touch driving electrodes and the touch driving circuit are disposed on the array substrate.

9. The display panel according to claim 8, wherein:

the touch driving electrodes extend in a first direction and are arranged in a second direction; and a plurality of touch sensing electrodes extending in the second direction and arranged in the first direction are disposed on the color film substrate, wherein the first direction intersects the second direction.

10. The display panel according to claim 9, wherein:

a plurality of data lines and a plurality of scanning lines are disposed on the array substrate, wherein a data line extends in the first direction, and a scanning line extends in the second direction.

11. A driving method for driving a display panel comprising a plurality of touch driving electrodes, and at least one touch driving circuit electrically connected to the touch driving electrodes, wherein the at least one touch driving circuit drives the display panel to enter a plurality of touch stages in one frame period, and the one frame period includes a plurality of touch stages and a plurality of display stages, in a touch stage, the at least one touch driving circuit provides a touch scanning signal to one of the plurality of touch driving electrodes and, meanwhile provides a common voltage signal to the other touch driving electrodes, wherein the display panel further includes a plurality of driving units one-to-one corresponding to the plurality of touch driving electrodes, a switching signal line, a touch scanning signal line, a common signal line, and a plurality of gate signal lines one-to-one corresponding to the plurality of driving units, wherein a driving unit is electrically connected to the switching signal line, the touch scanning signal line, the common signal line, and a corresponding gate signal line, and an output terminal of the driving unit is electrically connected to a corresponding touch driving electrode, wherein the driving method comprises:

in a display stage, providing, by the at least one touch driving circuit, the common voltage signal to the touch driving electrodes; and in the touch stage, providing, by the at least one touch driving circuit, the touch scanning signal to one of the plurality of touch driving electrodes and, meanwhile providing the common voltage signal to the other touch driving electrodes, wherein the driving method further comprises:

in the display stage:
  providing a first level signal to the switching signal line;
  providing the common voltage signal to the common signal line; and
  providing, by the touch driving units, the common voltage signal to the corresponding touch driving electrode, and in the touch stage,
  providing a second level signal to the switching signal line;
  providing the common voltage signal to the common signal line;
  providing a touch driving signal to the touch scanning signal line;
  providing the first level signal to one of the plurality of gate signal lines, such that a corresponding driving unit provides the touch driving signal to the corresponding touch driving electrode; and
  providing the second level signal to the other touch driving electrodes, such the other corresponding driving units provide the common voltage signal to the other corresponding touch driving electrodes, respectively.

12. The driving method according to claim 11, wherein: the touch driving signal is a period pulse signal.

13. The driving method according to claim 11, wherein: the first level signal is a high-level signal, and the second level signal is a low-level signal; or
the first level signal is a low-level signal, and the second level signal is a high-level signal.

14. The driving method according to claim 11, wherein the display panel further includes a second touch driving circuit, the touch driving electrode being a striped electrode, and the at least one touch driving circuit and the second touch driving circuit being respectively electrically connected to the touch driving electrode at two ends arranged in an extending direction of the touch driving electrode, the driving method further includes:
  in the display stage, providing, by the touch driving circuit, the common voltage signal to the touch driving electrodes; and
  in the touch stage, providing, by the at least one touch driving circuit and the second touch driving circuit, the touch scanning signal to one of the plurality of touch driving electrodes from the two ends of the touch driving electrode at the same time and, meanwhile providing the common voltage signal to the other touch driving electrodes from the two ends of the touch driving electrodes.

15. A display device comprising a display panel, wherein: the display panel comprises:
a plurality of touch driving electrodes, and
at least one touch driving circuit electrically connected to the plurality of touch driving electrodes,
wherein the at least one touch driving circuit drives the display panel to enter a plurality of touch stages in one frame period, the one frame period includes a plurality of touch stages and a plurality of display stages,
in a touch stage, the at least one touch driving circuit provides a touch scanning signal to one of the plurality of touch driving electrodes and, meanwhile provides a common voltage signal to the other touch driving electrodes, wherein the at least one touch driving circuit further includes:

a plurality of driving units one-to-one corresponding to the plurality of touch driving electrodes, a switching signal line, a touch scanning signal line, a common signal line, and a plurality of gate signal lines one-to-one corresponding to the plurality of driving units,
  wherein a driving unit is electrically connected to the switching signal line, the touch scanning signal line, the common signal line, and a corresponding gate signal line,
  an output terminal of the driving unit is electrically connected to a corresponding touch driving electrode, and
  controlled by a signal inputted by the switching signal line and a signal inputted by a corresponding gate signal line, the driving unit transmits at least one of a signal inputted by the touch scanning signal line and a signal inputted from the common signal line to the corresponding touch driving electrode.

16. The display device according to claim 15, wherein:

the at least one touch driving circuit further includes:

a first voltage signal line and a second voltage signal line; and the driving unit further includes:

a first inverter including an input terminal and an output terminal;

a NAND gate including a first input terminal, a second input terminal, and a first output terminal, a first gate unit including a first control terminal, a third input terminal, a fourth input terminal, and a second output terminal, and a second gate unit including a second control terminal, a fifth input terminal, a sixth input terminal, and a third output terminal, wherein the input terminal of the first inverter is electrically connected to the switching signal line, and the output terminal of the first inverter is electrically connected to the first input terminal of the NAND gate, the second input terminal of the NAND gate is electrically connected to the corresponding gate signal line, and the first output terminal of the NAND gate is electrically connected to the second control terminal of the second gate unit, the first control terminal of the first gate unit is electrically connected to the touch scanning signal line, the third input terminal of the first gate unit is electrically connected to the first voltage signal line, the fourth input terminal of the first gate unit is electrically connected to the second voltage signal line, and the second output terminal of the first gate unit is electrically connected to the sixth input terminal of the second gate unit, and the fifth input terminal of the second gate unit is electrically connected to the common voltage signal line, and the third output terminal of the second gate unit is electrically connected to an output terminal of the driving unit.

17. The display device according to claim 15, further including:
- a second touch driving circuit,
- wherein the touch driving electrode is a striped electrode, and
- the at least one touch driving circuit and the second touch driving circuit are respectively electrically connected to the touch driving electrode at two ends arranged in an extending direction of the touch driving electrode.

* * * * *